US012631287B2

(12) United States Patent
Liang et al.

(10) Patent No.: US 12,631,287 B2
(45) Date of Patent: May 19, 2026

(54) MAGNETIC SPHERICAL TRIPOD HEAD AND TRIPOD HEAD ASSEMBLY

(71) Applicant: Xiaoying Liang, Hong Kong (CN)

(72) Inventors: Xiaoying Liang, Hong Kong (CN); Kwok Fai Leung, Hong Kong (CN)

(73) Assignee: Xiaoying Liang, Hong Kong (CN)

( * ) Notice: Subject to any disclaimer, the term of this patent is extended or adjusted under 35 U.S.C. 154(b) by 47 days.

(21) Appl. No.: 18/775,432

(22) Filed: Jul. 17, 2024

(65) Prior Publication Data

US 2025/0155071 A1    May 15, 2025

(30) Foreign Application Priority Data

Nov. 9, 2023    (CN) .......................... 202311489692.6

(51) Int. Cl.
*F16M 11/14*          (2006.01)
*F16M 11/04*          (2006.01)

(52) U.S. Cl.
CPC ........... *F16M 11/14* (2013.01); *F16M 11/041* (2013.01); *F16M 2200/022* (2013.01)

(58) Field of Classification Search
CPC . F16M 11/14; F16M 11/041; F16M 2200/022
See application file for complete search history.

(56) References Cited

U.S. PATENT DOCUMENTS 3,815,892  A  *  6/1974   Tulk ........................... B25B 1/22
                                                    269/75
5,072,907  A  *  12/1991  Vogt ....................... F16C 11/106
                                                    403/90
5,249,766  A  *  10/1993  Vogt ....................... F16C 11/106
                                                    403/90
7,300,028  B2 * 11/2007  Vogt ....................... F16M 11/14
                                                    403/114
7,621,492  B2 * 11/2009  Omps ................. F16C 11/0619
                                                    248/181.1
8,083,190  B1 * 12/2011  Ma ......................... F16M 11/105
                                                    248/128
8,267,361  B1 *  9/2012  Dordick ................. F16M 11/14
                                                    396/419
8,282,055  B2 * 10/2012  Burklin .................. F16M 11/14
                                                    396/419
8,414,202  B2 *  4/2013  Li .......................... F16M 11/14
                                                    396/428

(Continued)

*Primary Examiner* — Monica E Millner

(74) *Attorney, Agent, or Firm* — HOWARD M COHN and Associates, LLC

(57) ABSTRACT

The present disclosure relates to a magnetic spherical tripod head and a tripod head assembly, which includes: a universal ball, comprising a ball head and a connecting handle; a limiting seat, comprising a ball seat for accommodating the ball head and a limiting piece movably abutting against the ball head and capable of limiting the rotation of the ball head in the ball seat; a magnetic piece, being fixed in the ball seat and attracting the ball head; a first fixing part and a second fixing part, being configured to detachably connect external accessories and respectively connected with the connecting handle and the limiting seat. The present disclosure overcomes the defect that the camera fixed on the existing spherical tripod head will quickly fall down and easily get damaged when the spherical tripod head is unlocked by the locking device.

6 Claims, 5 Drawing Sheets

(56)                    References Cited

U.S. PATENT DOCUMENTS

|  |  |  |  |  |
|---|---|---|---|---|
| 8,628,258 | B2 * | 1/2014 | Vogt ........................ | F16M 11/18 |
|  |  |  |  | 396/428 |
| 8,900,009 | B2 * | 12/2014 | Hornick ............. | F16M 11/2007 |
|  |  |  |  | 439/38 |
| 9,377,156 | B2 * | 6/2016 | Wong ................. | F16M 11/2092 |
| 10,422,469 | B2 * | 9/2019 | Clark ..................... | F16M 11/14 |
| 10,626,912 | B2 * | 4/2020 | Karai ................. | F16M 11/2078 |
| 12,449,087 | B2 * | 10/2025 | Grover ................... | F16M 11/14 |
| 2008/0267613 | A1 * | 10/2008 | Darrow ................. | F16M 11/14 |
|  |  |  |  | 396/428 |
| 2009/0317071 | A1 * | 12/2009 | David .................. | G03B 17/561 |
|  |  |  |  | 396/428 |
| 2011/0006170 | A1 * | 1/2011 | Liu ....................... | F16M 11/041 |
|  |  |  |  | 248/371 |
| 2014/0168890 | A1 * | 6/2014 | Barnard ............... | G06F 1/1626 |
|  |  |  |  | 248/181.2 |
| 2016/0091133 | A1 * | 3/2016 | Li .......................... | F16M 11/14 |
|  |  |  |  | 248/181.1 |

* cited by examiner

MAGNETIC SPHERICAL TRIPOD HEAD AND TRIPOD HEAD ASSEMBLY

TECHNICAL FIELD

The present disclosure relates to the technical field of camera accessories, and in particular, relates to a magnetic spherical tripod head and a tripod head assembly.

BACKGROUND

In the field of photography, tripod heads are an important camera support system, and tripod heads are basically indispensable as long as tripods are used. Depending on the principle of mechanical structures, tripod heads are divided into spherical tripod heads, three-dimensional tripod heads, cantilever tripod heads and hydraulic tripod heads or the like. Among the numerous tripod heads, the spherical tripod head has advantages of quick positioning and simple locking, which makes it an option for many people. At the same time, the price of the spherical tripod head is relatively low, and the volume and weight thereof can be made smaller. As compared to other types of tripod heads, the spherical tripod head may be made more compact and the production cost thereof is relatively low, and thus most portable tripods and tripod heads on the market adopt the design of spherical tripod heads.

SUMMARY

A technical solution adopted by the present disclosure is providing a magnetic spherical tripod head which includes a universal ball, a limiting seat, a magnetic piece, a magnetic piece, a first fixing part and a second fixing part. The universal ball comprises a ball head and a connecting handle, The limiting seat comprises a ball seat for accommodating the ball head and a limiting piece movably abutting against the ball head and capable of limiting the rotation of the ball head in the ball seat. The magnetic piece is fixed in the ball seat and attracts the ball head. The first fixing part and the second fixing part is configured to detachably connect external accessories and respectively connected with the connecting handle and the limiting seat.

DESCRIPTION OF REFERENCE NUMERALS

Figure 1:
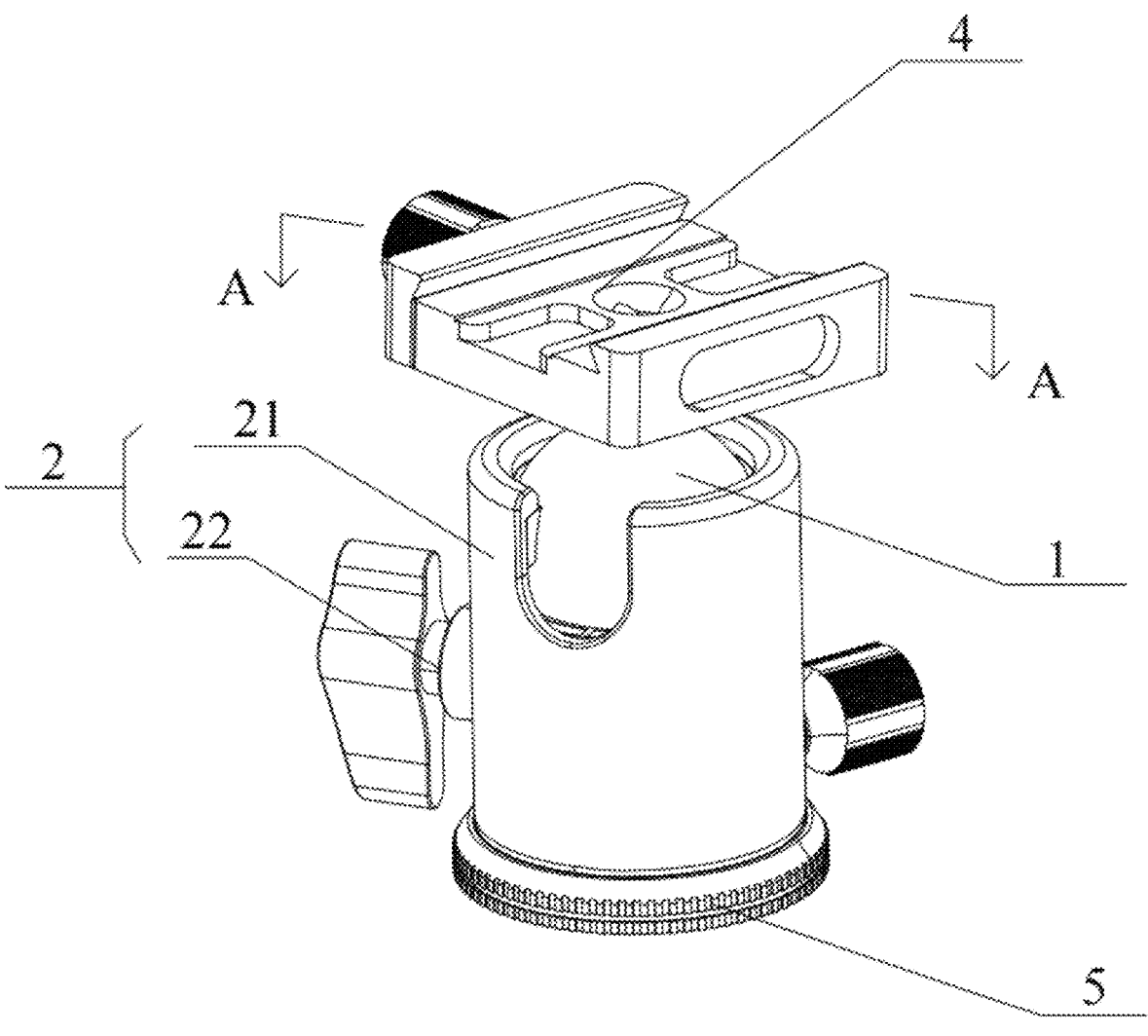
FIG. 1 is a schematic view of the overall structure of Example 1 according to the present disclosure.

1: Universal ball; 11: Ball head; 12: Connecting handle; 2: Limiting seat; 21: Ball seat; 211: Annular seat; 2110: Frustum hole; 212: Cylindrical shell; 2121: Avoidance groove; 22: Limiting piece; 221: First clamping block; 2211: chamfers; 222: Second clamping block; 223: Bidirectional screw; 224: Adjusting handle; 3: Magnetic piece; 31: Arc-shaped magnetic ring; 311: Magnetic blocks; 32: Annular magnetic ring; 4: First fixing part; 40: Inverted trapezoidal slot; 41: Fixing plate; 42: Adjusting plate; 43: First limiting rotary rod; 5: Second fixing part; 51: Rotating pedestal; 52: Second limiting rotary rod; 53: Mounting screw hole.

DETAILED DESCRIPTION

The present disclosure will be further described with reference to specific embodiments. The attached drawings are only used for illustrative purposes to show schematic views only instead of pictures of real products, and thus they cannot be construed as limitations on this patent. In order to better illustrate the embodiment of the present disclosure, some parts in the attached drawings are omitted, enlarged or reduced, which does not represent the size of the actual products. As shall be appreciated by those skilled in the art, some well-known structures in the attached drawings and descriptions thereof may be omitted.

The same or similar reference numerals in the attached drawings of the embodiments of the present disclosure correspond to the same or similar components. In the description of the present disclosure, it shall be appreciated that if the orientation or positional relationships indicated by terms such as "upper", "lower", "left" and "right" are based on the orientation or positional relationships shown in the attached drawings, then these terms are only used for convenience of describing the present disclosure and simplifying the description, and they do not indicate or imply that the devices or elements referred to must have a specific orientation, or must be constructed and operated in a specific orientation. Therefore, the terms for describing the positional relationships in the attached drawings are only used for illustrative purposes, and cannot be construed as limitations on this patent. For those of ordinary skill in the art, the specific meanings of the above terms can be understood according to specific conditions.

Example 1

Figure 2:
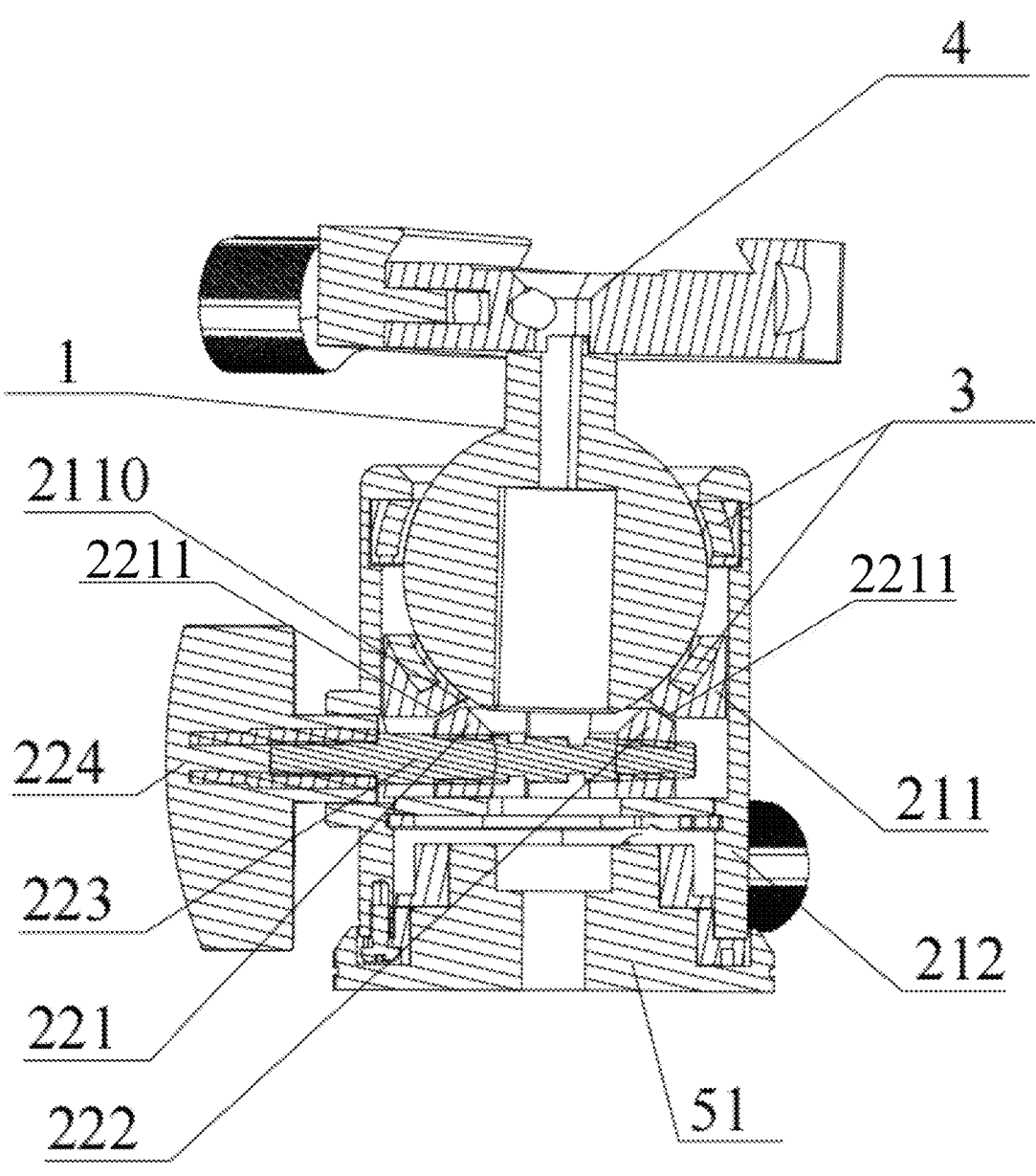
FIG. 2 is a cross-sectional view taken at A-A in FIG. 1.
Figure 3:
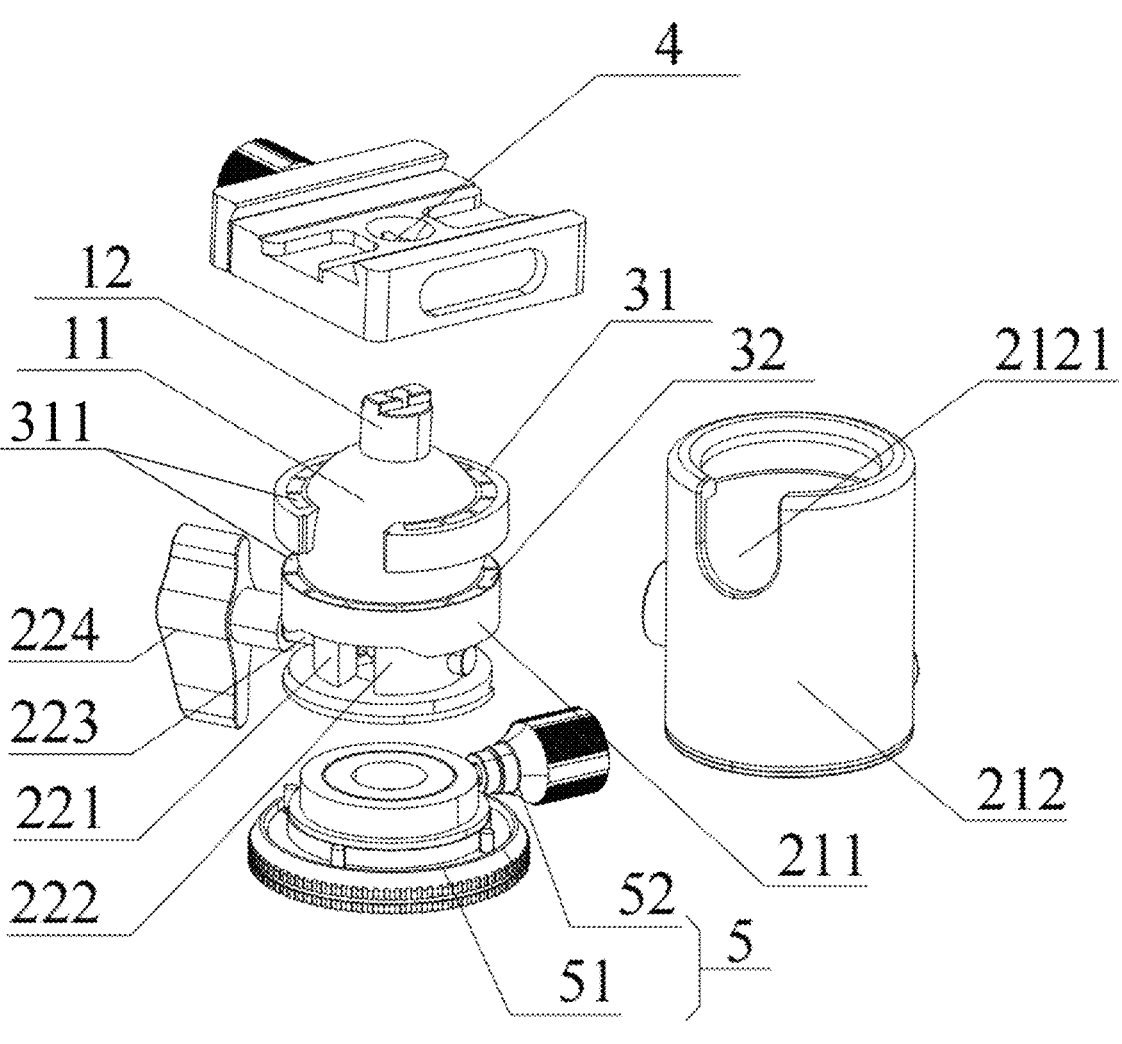
FIG. 3 is an exploded diagram of Example 1 according to the present disclosure.

As shown in FIG. 1 to FIG. 3, a magnetic spherical tripod head is provided which includes a universal ball 1, a limiting seat 2, a magnetic piece 3, a first fixing part 4 and a second fixing part 5. The universal ball 1 includes a ball head 11 and a connecting handle 12. The limiting seat 2 includes a ball seat 21 for accommodating the ball head 11 and a limiting piece 22 movably abutting against the ball head 11 and capable of limiting the rotation of the ball head 11 in the ball seat 21. The magnetic piece 3 is fixed in the ball seat 21 and attracts the ball head 11. The first fixing part 4 and the second fixing part 5 is configured to detachably connect external accessories and respectively connected with the connecting handle 12 and the limiting seat 2.

In this embodiment, the ball head 11 of the universal ball 1 is made of a magnetically attractable metal material.

This embodiment features a simple structure, the magnetic piece 3 is introduced to form a preset and fixed magnetic attraction force with the universal ball 1, and the magnetic attraction force is smaller than the maximum static friction force between the limiting piece 22 and the ball head 11 and larger than or equal to the sliding friction force between the limiting piece 22 and the ball head 11.

In combination with the advantages of multi-angle adjustment and fastening of the universal ball 1, this embodiment overcomes the technical defect that the existing spherical tripod head is prone to "nodding" to cause damage to external accessories after wearing or losing locking force. In this embodiment, the preset magnetic attraction force exists stably, and combined with the movable abutting and limiting of the limiting piece 22, the safety of use of the spherical tripod head is optimized when the shooting angle is adjusted and fixed at will, and the damage to external accessories is reduced. At the same time, when rapid composition and shooting are needed, the shooting angle of the camera will not be greatly changed by the ball head 11 under the magnetic attraction force of the magnetic piece 3 after the limiting piece 22 is released. Thus, the manual fine-tuning of angle can be better realized by the magnetic fixation, and perfect composition and shooting effects can be achieved by finely adjusting the angle, thereby providing excellent practical performance and broad market prospects.

In this embodiment, the first fixing part 4 is fixedly connected with the connecting handle 12 and is used for externally connected with a camera, and the second fixing part 5 is connected with the limiting seat 2 and used for externally connected with a tripod, a support rod or a stabilizer. During use, the ball head 11 rotates in the ball seat 21, and the connecting handle 12 on the ball head 11 faces upwards and can rotate and swing in a certain space. The first fixing part 4 connected with the connecting handle 12 is externally connected with the camera to realize adjustment and rotation at different positions and angles. By switching the connection of the connecting handle 12 and the limiting seat 2 with the first fixing part 4 and the second fixing part 5, different matching external accessories can be quickly assembled and disassembled, thereby realizing the multifunctional use of the magnetic spherical tripod head of this embodiment.

As shown in FIG. 2 to FIG. 3, the limiting piece 22 includes a first clamping block 221 and a second clamping block 222 which are positioned in the ball seat 21 and can move relatively, and a bidirectional screw 223 with one end penetrating through the ball seat 21 and being in threaded connection with the first clamping block 221 and the second clamping block 222 at the same time. When the bidirectional screw 223 is rotated, the spiral directions of the first clamping block 221 and the second clamping block 222 are opposite, and the first clamping block 221 and the second clamping block 222 movably abut against the ball head 11 under the rotation of the bidirectional screw 223.

It shall be noted that the limiting piece 22 used for fixing the angle of the universal ball 1 clamps the ball head 11 to achieve locking, and rotating the bidirectional screw 223 clockwise or counterclockwise can make the first clamping block 221 and the second clamping block 222 with opposite spiral directions move towards each other or away from each other. Based on the above principle, whether the first clamping block 221 and the second clamping block 222 abut against the ball head 11 is adjusted so that the rotation angle of the ball head 11 is fixed. Such a fastening mode of the limiting piece 22 is simple in structure and the movement is reliable and effective.

In this embodiment, one side of the first clamping block 221 and the second clamping block 222 contacting with the ball head may be provided with rubber gaskets, which can provide a greater friction resistance and a better limiting effect.

As shown in FIG. 2 to FIG. 3, the limiting piece 22 further includes an adjusting handle 224 provided at the other end of the bidirectional screw 223. The arrangement of the adjustment handle 224 facilitates the application of force to rotate the bidirectional screw 223 and reduces the difficulty of operation.

In this embodiment, the magnetic piece 3 includes an arc-shaped magnetic ring 31 and an annular magnetic ring 32 distributed around the periphery of the ball head 11, wherein both the arc-shaped magnetic ring 31 and the annular magnetic ring 32 are formed by arranging a plurality of magnetic blocks 311 in sequence, and one side of the arc-shaped magnetic ring 31 and the annular magnetic ring 32 facing the ball head 11 is matched with the spherical radian of the ball head 11. In this way, the magnetic piece 3 can fit the arc shape of the ball head 11, and the processing difficulty of each magnetic block as well as the installation and fixation difficulty of the arc-shaped magnetic ring 31 or the annular magnetic ring 32 at the outer side of the ball head 11 can be reduced.

As shown in FIG. 2, the ball seat 21 includes an annular seat 211 surrounding the end of the ball head 11 and a cylindrical shell 212 surrounding the outer side of the annular seat 211. One end of the bidirectional screw 223 penetrates through the cylindrical shell 212 and is in threaded connection with the first clamping block 221 and the second clamping block 222 respectively.

In this embodiment, the annular magnetic ring 32 in the magnetic piece 3 is embedded on the annular seat 211 and located between the cylindrical shell 212 and the ball head 11.

It shall be noted that the annular seat 211 is sleeved on the end of the ball head 11 in the shape of a bowl, which provides a rotary base for the ball head 11. The annular magnetic ring 32 in the magnetic piece 3 is embedded in the annular seat 211, the arc-shaped magnetic ring 31 in the magnetic piece 3 is arranged around the periphery of the ball head 11 so as to form a rotary base for the ball head 11 together with the annular magnetic ring 32 in the annular seat 211. At the same time, the magnetic piece 3 generates a uniform magnetic attraction force to the ball head 11 so that the overall structural design is optimized. On the one hand, the ball head 11 can be well fastened and limited, and on the other hand, a uniform adsorption force can be formed on the ball head 11 so that the damping effect for the ball head 11 is the same when rotating, and a better hand feeling and effect for use are provided.

As shown in FIG. 2, the bottom of the annular seat 211 is opened with a frustum hole 2110 with a gradually increasing diameter, the first clamping block 221 and the second clamping block 222 move relatively within the outer diameter range of the bottom surface of the frustum hole 2110, and the peripheries of the upper end faces of the first clamping block 221 and the second clamping block 222 are provided with chamfers 2211 parallel to the inner inclined surface of the frustum hole 2110.

It shall be noted that the annular seat 211 cooperates with the limiting piece 22, the frustum hole 2110 is opened at the bottom of the annular seat 211, the first clamping block 221 and the second clamping block 222 are limited to move within the outer diameter range of the bottom surface of the frustum hole 2110, the ball head 11 is erected in the annular seat 211, the end of the ball head 11 is exposed from the lower bottom surface of the frustum hole 2110, and the first clamping block 221 and the second clamping block 222 movably abut against the end of the ball head 11 at the lower bottom surface of the frustum hole 2110. Because contact fit is formed between the inner inclined surface of the frustum hole 2110 and the chamfers 2211 formed on the upper end faces of the first clamping block 221 and the second clamping block 222, on the one hand, the first clamping block 221 and the second clamping block 222 can be guided when they move, and on the other hand, the stability when the first clamping block 221 and the second clamping block 222 move is improved.

As shown in FIG. 3, the end of the cylindrical shell 212 is opened with an avoidance groove 2121, and the avoidance groove 2121 is located at one end of the connecting handle 12 extending out of the cylindrical shell 212. In this embodiment, the arc-shaped magnetic ring 31 in the magnetic piece 3 is located at one end of the cylindrical shell 212 that is opened with the avoidance groove 2121, and the arc-shaped magnetic ring 31 is arranged around the periphery of the ball head 11 and forms an avoidance space just at the avoidance groove 2121.

The avoidance groove 2121 can increase the rotation angle of the universal ball 1. Because the connecting handle 12 is arranged above the ball head 11 in the universal ball 1, there is contact interference between the connecting handle 12 and the cylindrical shell 212, and the rotation range of the connecting handle 12 is restricted. When the upper end of the cylindrical shell 212 is opened with the avoidance groove 2121, the connecting handle 12 may rotate into the avoidance groove 2121 during the rotation of the ball head 11, thereby increasing the rotation angle and swing range of the universal ball 1.

Advantages of this embodiment lie in that, a fixed adsorption force is formed between the ball head 11 and the ball seat 21 through the magnetic piece 3, the magnetic piece 3 can attract the ball head 11 and provide the magnetic attraction force for adsorption and fastening of the ball head 11. In this way, when the abutting locking force exerted by the limiting piece 22 on the ball head 11 is reduced, the magnetic attraction force can play the role of auxiliary adsorption, buffering and damping, and it can provide certain support for the ball head 11 so that the ball head 11 will not fall down rapidly under the gravity of itself or the gravity of external accessories connected with the first fixing part 4, thereby avoiding the damage to the external accessories. Meanwhile, when rapid composition and shooting are needed, the shooting angle of the camera will not be greatly changed by the ball head 11 under the magnetic attraction force of the magnetic piece 3 after the limiting piece 22 is released, and thus manual fine-tuning of angle can be better realized by the magnetic fixation, and perfect composition and shooting effects can be achieved through finely adjusting the angle. In addition, unlike the contact damping between the traditional rubber block and the ball head 11 where the damping gradually decreases due to wear after long-term use, the magnetic attraction force between the magnetic piece 3 and the ball head 11 in this embodiment can exist stably for a long time, thereby providing excellent reliability and stability.

Example 2

This example is similar to Example 1 except for the following aspects.

In this embodiment, the first fixing part 4 is fixedly connected with the connecting handle 12 and is used for externally connected with a tripod, a supporting rod or a stabilizer, and the second fixing part 5 is connected with the limiting seat 2 and is used for externally connected with a camera. During use, the ball head 11 rotates in the ball seat 21, the connecting handle 12 of the ball head 11 faces downward, the first fixing part 4 connected with the connecting handle 12 is externally connected with a tripod, a supporting rod or a stabilizer, the second fixing part 5 connected with the limiting seat 2 is connected with a camera, and the position and angle adjustment of the camera is realized by swinging the limiting seat 2 so that the limiting seat 2 swings within a certain spatial range around the ball head 11. By switching the connection of the connecting handle 12 and the limiting seat 2 with the first fixing part 4 and the second fixing part 5, different matching external accessories can be quickly assembled and disassembled, thereby realizing the multifunctional use of the magnetic spherical tripod head of this embodiment.

Other structures and principles of this example are the same as those of Example 1.

Example 3

This example is similar to Example 1 except for the following aspects.

Figure 4:
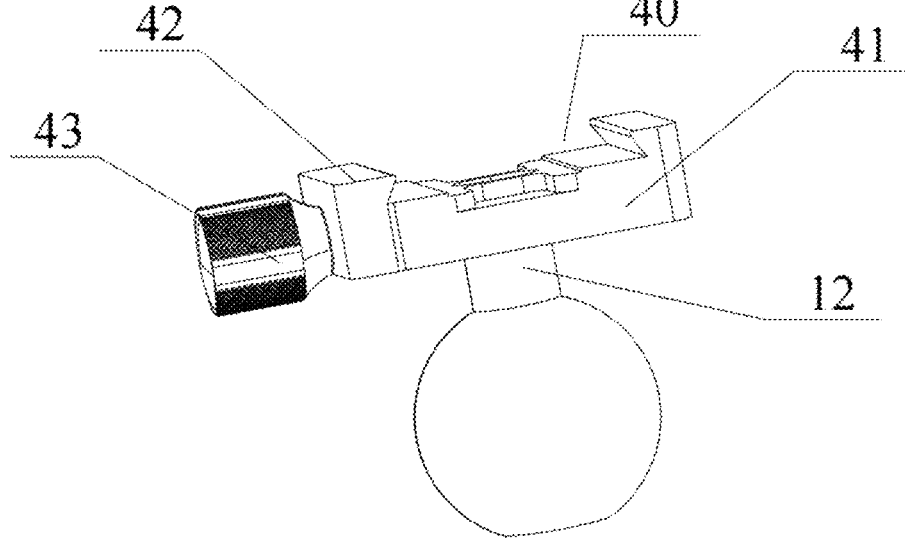
FIG. 4 is a schematic view illustrating the connection of a first fixing part in Embodiment 3 of the present disclosure.

As shown in FIG. 4, the first fixing part 4 includes a fixing plate 41 fixed on the connecting handle 12, an adjusting plate 42 movably abutting against the fixing plate 41, and a first limiting rotary rod 43 with one end penetrating through the adjusting plate 42 and being in threaded connection with the fixing plate 41, wherein the upper end faces of the fixing plate 41 and the adjusting plate 42 form an inverted trapezoidal slot 40 with a small opening and a large bottom for clamping a quick release plate of a camera. It shall be noted that the width of the inverted trapezoidal slot 40 is adjustable under the movement of the adjusting plate 42, so that it can be adapted to quick release plates of various specifications and sizes. In this embodiment, the first fixing part 4 connected with the connecting handle 12 is preferably used for externally connected with a camera and other accessories, and the connecting handle 12 faces upwards during use so that it is more convenient to rotate and adjust the angle during use in this embodiment.

Figure 5:
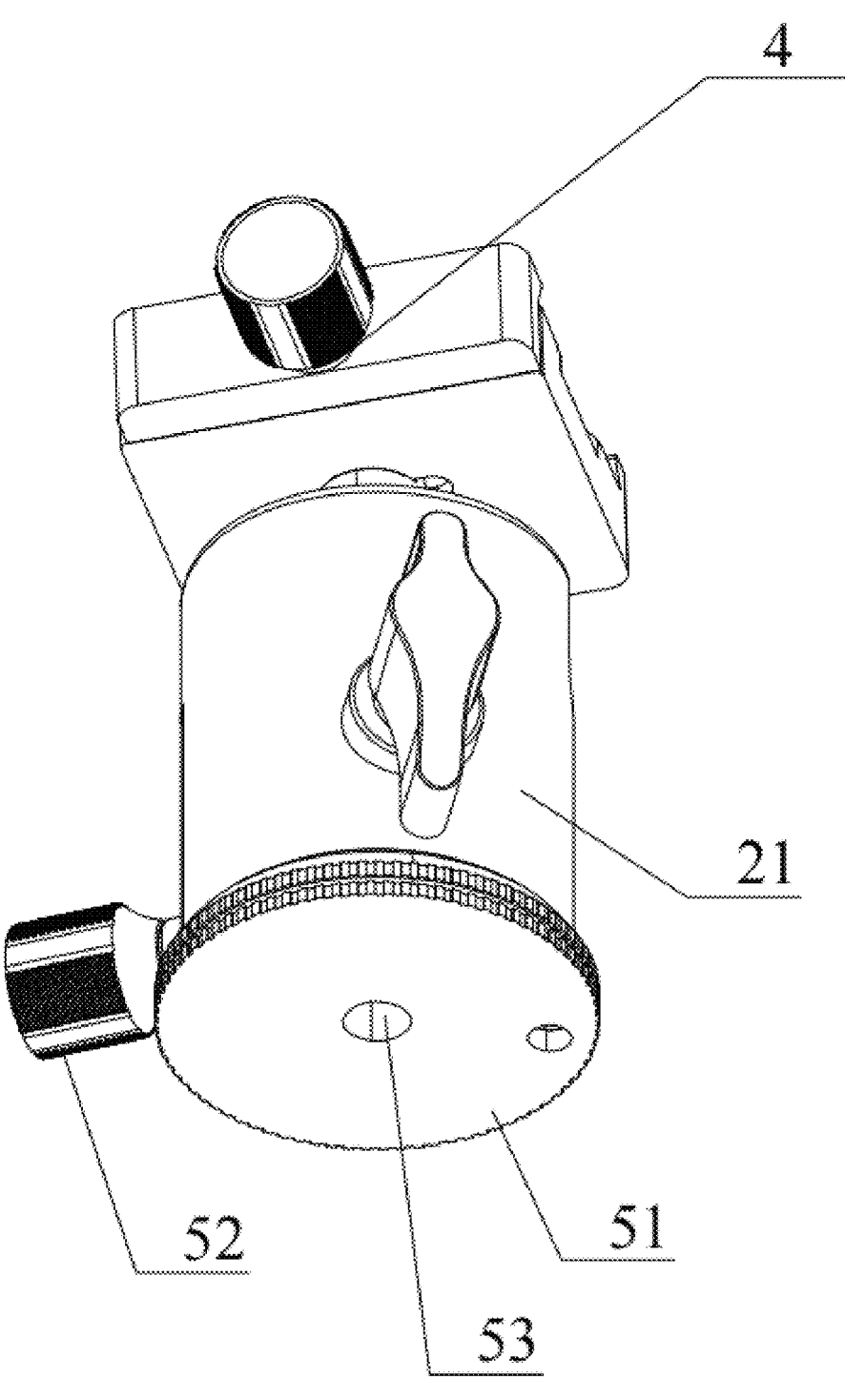
FIG. 5 is a schematic view illustrating the connection of a second fixing part in Embodiment 3 of the present disclosure.

As shown in FIG. 3 and FIG. 5, the second fixing part 5 includes a rotating pedestal 51 with one end inserted in the ball seat 21 and rotatably buckled with the lower end of the ball seat 21, and a second limiting rotary rod 52 with one end penetrating through the ball seat 21 and movably abutting against the rotating pedestal 51. The second limiting rotary rod 52 is in threaded connection with the ball seat 21, and the bottom of the rotating pedestal 51 is further opened with a mounting screw hole 53 for threaded connection with a tripod. It shall be noted that the mounting part of the tripod and other external accessories is provided with standard mounting bolts. In this embodiment, after the tripod is fixed with the rotating pedestal 51, if it is necessary to adjust the shooting angle, then the universal ball 1, the limiting seat 2, the first fixing part 4 and other structures relatively fixed with the ball seat 21 may be driven to rotate relative to the rotating pedestal 51 by rotating the ball seat 21, so as to realize 360-degree angle adjustment with the axis of the ball seat 21 as the center. By screwing the second limiting rotary rod 52, the second limiting rotary rod 52 abuts against the rotating pedestal 51, so that the relative rotation between the rotating pedestal 51 and the ball seat 21 is restricted, and the structure is simple and effective.

In this embodiment, the rotating pedestal 51 is rotationally buckled with the cylindrical shell 212, and the second limiting rotary rod 21 penetrates through the cylindrical shell 212 and movably abuts against the part of the rotating pedestal 51 extending into the cylindrical shell 212.

Other structures and principles of this example are the same as those of Example 1.

Example 4

A tripod head assembly including a tripod is provided, the tripod head further includes the magnetic spherical tripod head described in the above examples, and the second fixing part 5 is detachably screwed with the tripod.

It shall be noted that the mounting part of the tripod and other external accessories is provided with standard mounting bolts. In this embodiment, after the tripod is fixed with the rotating pedestal 51, if it is necessary to adjust the shooting angle, then the universal ball 1, the limiting seat 2, the first fixing part 4 and other structures relatively fixed with the ball seat 21 may be driven to rotate relative to the rotating pedestal 51 by rotating the ball seat 21, so as to realize 360-degree angle adjustment with the axis of the ball seat 21 as the center. By screwing the second limiting rotary rod 52, the second limiting rotary rod 52 abuts against the rotating pedestal 51, so that the relative rotation between the rotating pedestal 51 and the ball seat 21 is restricted, and the structure is simple and effective.

Obviously, the above-mentioned embodiments of the present disclosure are only examples for clearly explaining the present disclosure, and are not intended to limit the implementation of the present disclosure. For those of ordinary skill in the art, other changes or variations in different forms can be made on the basis of the above description. It is unnecessary and impossible to exhaust all the embodiments here. Any modification, equivalent substitution and improvement made within the spirit and principle of the present disclosure shall be included in the scope claimed in the claims of the present disclosure.

It shall be noted that the specification and attached drawings of the present disclosure provide preferred embodiments of the present disclosure. However, the present disclosure may be realized in many different forms and thus is not limited to the embodiments described in this specification. These embodiments are not used as additional restrictions on the contents of the present disclosure, and these embodiments are only provided to make the disclosure more thorough and comprehensive. Moreover, the above technical features continue to be combined to form various embodiments not listed above, which are all regarded as within the scope recorded in the specification of the present disclosure. Further speaking, improvements or changes can be made by those of ordinary skill in the art according to the above description, and all these improvements and changes shall fall within the scope claimed in the appended claims.

The invention claimed is:

1. A magnetic spherical tripod head, comprising:
   a universal ball (1), comprising a ball head (11) and a connecting handle (12), a limiting seat (2), comprising a ball seat (21) for accommodating the ball head (11) and a limiting piece (22) movably abutting against the ball head (11) and being configured to limit the rotation of the ball head (11) in the ball seat (21),
   a magnetic piece (3), being fixed in the ball seat (21) and attracting the ball head (11),
   a first fixing part (4) and a second fixing part (5), being configured to detachably connect external accessories and respectively connected with the connecting handle (12) and the limiting seat (2), wherein the magnetic piece (3) comprises an arc-shaped magnetic ring (31) and/or an annular magnetic ring (32) distributed around the periphery of the ball head (11), and both the arc-shaped magnetic ring (31) and the annular magnetic ring (32) are formed by arranging a plurality of magnetic blocks (311) in sequence, and one side of the arc-shaped magnetic ring (31) and the annular magnetic ring (32) facing the ball head (11) is matched with the spherical radian of the ball head (11).

2. The magnetic spherical tripod head according to claim 1, wherein the limiting piece (22) comprises a first clamping block (221) and a second clamping block (222) which are positioned in the ball seat (21) and are configured to move relatively, and a bidirectional screw (223) with one end penetrating through the ball seat (21) and being in threaded connection with the first clamping block (221) and the second clamping block (222) at the same time, wherein when the bidirectional screw (223) is rotated, the spiral directions of the first clamping block (221) and the second clamping block (222) are opposite, and the first clamping block (221) and the second clamping block (222) movably abut against the ball head (11) under the rotation of the bidirectional screw (223).

3. The magnetic spherical tripod head according to claim 2, wherein the limiting piece (22) further comprises an adjusting handle (224) arranged at the other end of the bidirectional screw (223).

4. The magnetic spherical tripod head according to claim 2, wherein the ball seat (21) comprises an annular seat (211) surrounding the end of the ball head (11) and a cylindrical shell (212) surrounding the outer side of the annular seat (211),
   one end of the bidirectional screw (223) penetrates through the cylindrical shell (212) and is in threaded connection with the first clamping block (221) and the second clamping block (222) respectively, and the magnetic piece (3) is embedded on the annular seat (211) and located between the cylindrical shell (212) and the ball head (11).

5. The magnetic spherical tripod head according to claim 4, wherein the bottom of the annular seat (211) is opened with a frustum hole (2110) with a gradually increasing diameter, wherein the first clamping block (221) and the second clamping block (222) move relatively within the outer diameter range of the bottom surface of the frustum hole (2110), and the peripheries of the upper end faces of the first clamping block (221) and the second clamping block (222) are provided with chamfers (2211) parallel to the inner inclined surface of the frustum hole (2110).

6. The magnetic spherical tripod head according to claim 4, wherein the end of the cylindrical shell (212) is opened with at least one avoidance groove (2121), and the avoidance groove (2121) is located at one end of the connecting handle (12) extending out of the cylindrical shell (212).

* * * * *